(12) United States Patent
Yang

(10) Patent No.: US 7,168,420 B1
(45) Date of Patent: Jan. 30, 2007

(54) SYSTEM AND METHOD FOR ENGINE OPERATION WITH SPARK ASSISTED COMPRESSION IGNITION

(75) Inventor: Jialin Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/232,822

(22) Filed: Sep. 21, 2005

(51) Int. Cl.
F02M 25/07 (2006.01)
F02B 17/00 (2006.01)

(52) U.S. Cl. .................................. 123/568.15; 123/295

(58) Field of Classification Search ........... 123/568.12, 123/568.15, 568.17, 568.19, 568.21, 295, 123/305, 559.1, 563, 698, 700; 60/605.2, 60/599
See application file for complete search history.

(56) References Cited

U.S. PATENT DOCUMENTS

| | | | |
|---|---|---|---|
| 5,036,668 A | 8/1991 | Hardy | |
| 6,267,097 B1 | 7/2001 | Urushihara et al. | |
| 6,276,334 B1 | 8/2001 | Flynn et al. | |
| 6,293,246 B1 | 9/2001 | Tanahashi et al. | |
| 6,295,973 B1 | 10/2001 | Yang | |
| 6,308,682 B1 * | 10/2001 | Ma ............................ | 123/295 |
| 6,336,436 B1 | 1/2002 | Miyakubo et al. | |
| 6,390,054 B1 | 5/2002 | Yang | |
| 6,463,889 B2 * | 10/2002 | Reddy ........................ | 123/3 |
| 6,516,774 B2 | 2/2003 | zur Loye et al. | |
| 6,570,265 B1 | 5/2003 | Shiraishi et al. | |
| 6,619,254 B2 | 9/2003 | Chmela et al. | |
| 6,622,710 B2 | 9/2003 | Hasegawa et al. | |
| 6,675,579 B1 | 1/2004 | Yang | |
| 6,725,825 B1 | 4/2004 | Kurtz et al. | |
| 6,739,295 B1 | 5/2004 | Yamaoka et al. | |
| 6,923,167 B2 * | 8/2005 | Flowers ................. | 123/568.15 |
| 6,932,175 B2 * | 8/2005 | Teraji et al. ............... | 180/65.2 |
| 7,036,482 B2 * | 5/2006 | Beck et al. ................. | 123/229 |
| 2004/0065279 A1 | 4/2004 | Hitomi et al. | |
| 2004/0182359 A1 | 9/2004 | Stewart et al. | |
| 2005/0121008 A1 | 6/2005 | Kikenny et al. | |
| 2005/0173169 A1 | 8/2005 | Gray, Jr. | |

OTHER PUBLICATIONS

O. Lang et al, "Thermodynamical and Mechanical Approach Towards a Variable Valve Train for the Controlled Auto Ignition Combustion Process," SAE Technical Paper No. 2005-01-07, Apr. 11-14, 2005.

* cited by examiner

*Primary Examiner*—John T. Kwon
(74) *Attorney, Agent, or Firm*—Allan J. Lippa; Alleman Hall McCoy Russell & Tuttle LLP

(57) ABSTRACT

A method of operating an internal combustion engine having a combustion chamber with a piston, comprising: inducting at least air and fuel vapors from a fuel vapor system; and adjusting an operating condition of the engine so that a mixture of air and fuel in the combustion chamber, including said fuel vapor, approaches, but does not achieve, said autoignition temperature; and performing a spark from the spark plug so that said mixture substantially auto-ignites.

20 Claims, 9 Drawing Sheets

SYSTEM AND METHOD FOR ENGINE OPERATION WITH SPARK ASSISTED COMPRESSION IGNITION

FIELD

The present application relates to controlling engine operation during various combustion modes.

BACKGROUND AND SUMMARY

Various types of combustion may be used in an internal combustion engine. For example, spark ignition (SI) of a homogenous mixture during the expansion stroke is one example method. This method relies on a timed spark from a sparking plug in order to achieve ignition within the combustion chamber of an air and fuel mixture. Another type of combustion may be referred to as homogeneous charge compression ignition (HCCI), which occurs when the temperature of the combustion chamber exceeds the required conditions for the specific fuel resulting in autoignition. HCCI can be used to provide greater fuel efficiency and reduced NOx production under some conditions. One example of such operation is described in U.S. Pat. No. 6,390,054.

The inventors herein have recognized that one issue with such autoignition-type operation is that the timing of combustion can be affected by many parameters. For example, the timing of combustion may be affected by charge temperature, air-fuel ratio, engine speed, and/or engine load. Specifically, small variations in such parameters can result in auto-ignition occurring too early, or too late. Such variation can increase emissions and reduce fuel savings, thereby degrading performance.

As such, the inventors herein have also recognized that, when trying to purge fuel vapors into the engine, one particular way in which combustion timing may be inadvertently affected is due to uncertainty in the concentration and/or amount of fuel vapors being purged into the combustion chamber. In other words, during fuel vapor purging operations, recycled fuel vapors may substantially increase the variability of fuel temperature, atomization and/or air-fuel ratio, thus exacerbating degradation of ignition timing control. One approach is to avoid fuel vapor purging during auto-ignition operation, and discontinue such operation when it is necessary to purge fuel vapors; however, this can limit the available time to operating with auto-ignition.

In another approach, the above issues may be addressed by a method of operating an internal combustion engine having a combustion chamber with a piston, comprising: inducting at least air and fuel vapors from a fuel vapor system; and adjusting an operating condition of the engine so that a mixture of air and fuel in the combustion chamber, including said fuel vapor, approaches, but does not achieve, said autoignition temperature; and performing a spark from the spark plug so that said mixture substantially auto-ignites.

In this way, it is possible, during at least some periods of fuel vapor purging, to utilize a spark-assisted autoignition, and thereby still maintain accurate control of combustion timing while also purging fuel vapors. Thus, additional auto-ignition operation can be realized, while still providing sufficient opportunity to purge fuel vapors. Note that spark-assisted auto-ignition may be used without fuel vapor purging as well, if desired.

DETAILED DESCRIPTION OF THE DRAWINGS

DETAILED DESCRIPTION

Figure 1:
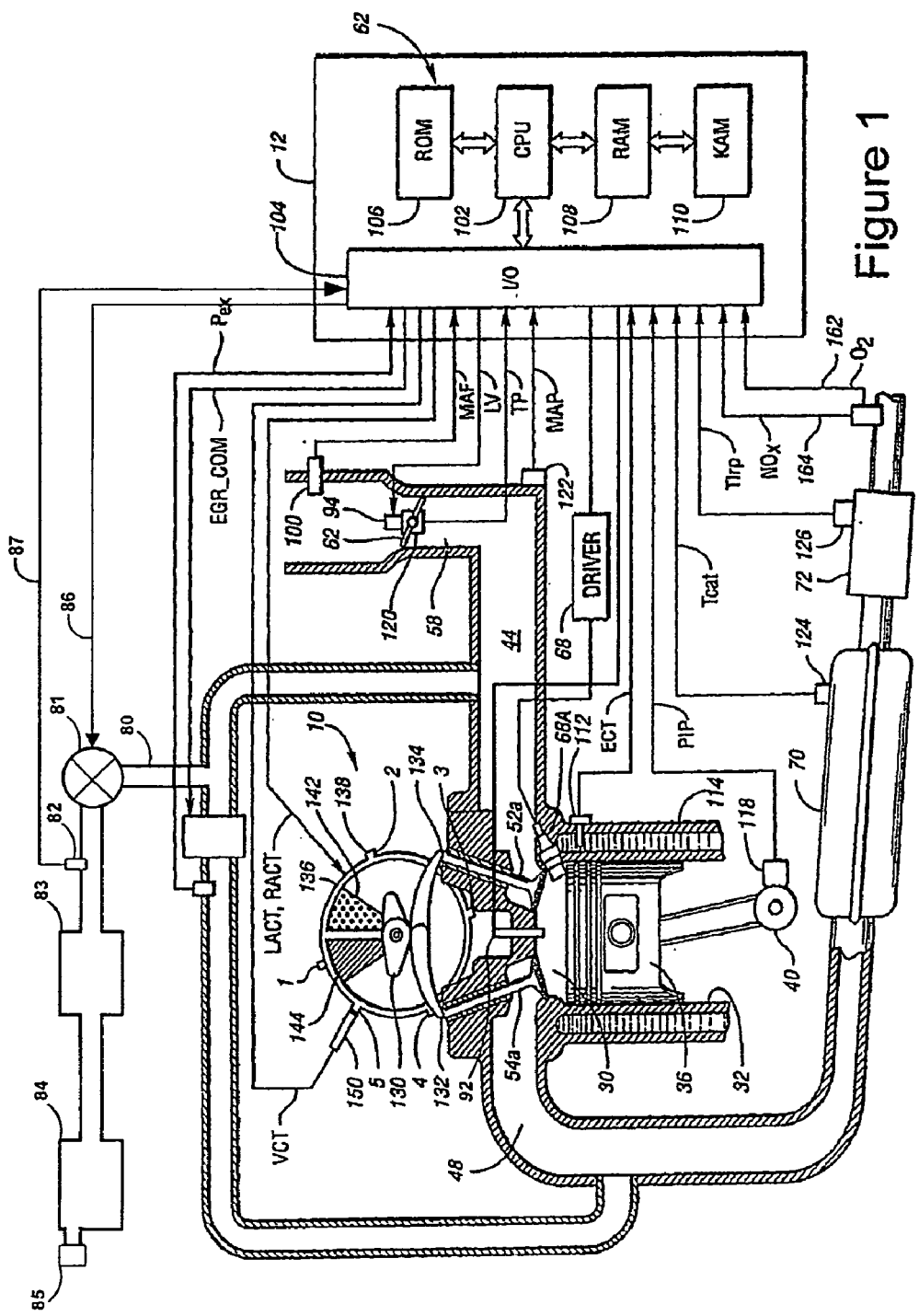
FIG. 1 shows an internal combustion engine and control system.

Direct injection spark ignited internal combustion engine 10, comprising a plurality of combustion chambers, is controlled by electronic engine controller 12 as shown in FIG. 1. Combustion chamber 30 of engine 10 includes combustion chamber walls 32 with piston 36 positioned therein and connected to crankshaft 40. In one example, piston 36 includes a recess or bowl (not shown) to form selected levels of stratification or homogenization of charges of air and fuel. Alternatively, a flat piston may also be used.

Combustion chamber 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to the pulse width of signal fpw received from controller 12 via conventional electronic driver 68. Fuel is delivered to fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. Exhaust gas oxygen sensor 76 is shown coupled to exhaust manifold 48 upstream of catalytic converter 70. In an alternative embodiment, sensor 76 can provide a signal which indicates whether exhaust air-fuel ratio is either lean of stoichiometry or rich of stoichiometry. A mechanical supercharger (not shown) or mechanical turbocharger (not shown) may be coupled to engine 10, in one example.

Distributorless ignition system (not shown) provides ignition spark to combustion chamber 30 via spark plug 92 in response to spark advance signal SA from controller 12. Controller 12 activates fuel injector 66 during the intake stroke so that a desired air-fuel ratio mixture is formed when ignition power is supplied to spark plug 92 by an ignition system. Controller 12 controls the amount of fuel delivered by fuel injector 66 so that the air-fuel ratio mixture in chamber 30 can be selected to be substantially at (or near) stoichiometry, a value rich of stoichiometry, or a value lean of stoichiometry.

Nitrogen oxide (NOx) absorbent or trap 72 is shown positioned downstream of catalytic converter 70. NOx trap 72 absorbs NOx when engine 10 is operating lean of stoichiometry. The absorbed NOx is subsequently reacted with HC and catalyzed during a NOx purge cycle when controller 12 causes engine 10 to operate in either a rich mode or a near stoichiometric mode.

Controller 12 is shown in FIG. 1 as a conventional microcomputer including: microprocessor unit 102, input/output ports 104, an electronic storage medium of executing programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

Fuel tank 84 is coupled to carbon canister 83 via tube 80. Fuel vapors (not shown) generated in fuel tank 84 are controlled via valve 85. Further fuel vapors are stored in carbon canister 83 connected to fuel tank 84 by tube 80. Fuel vapors are further controlled by purge control valve 81. Purge control valve 81 receives control signal 86 from controller 12. Vapor concentration sensor 82 communicates the concentration of fuel vapors within tube 80 via signal to controller 12. Tube 80 connects purge control valve 81 to intake manifold 44. In this manner excess fuel vapors may be stored and later introduced to the intake air via the intake manifold.

As will be described in more detail below, combustion in engine 10 can be of various types, depending on operating conditions. In one example, spark ignition (SI) can be employed where the engine utilizes a sparking device, such as spark plug coupled in the combustion chamber, to regulate the timing of combustion of combustion chamber gas at a predetermined time after top dead center of the expansion stroke. In one example, during spark ignition operation, the temperature of the air entering the combustion chamber is considerably lower than the temperature required for autoignition. While SI combustion may be utilized across a broad range of engine load and engine speed it may produce increased levels of NOx and lower fuel efficiency when compared with other types of combustion.

Another type of combustion that may be employed by engine 10 uses homogeneous charge compression ignition (HCCI), where autoignition of combustion chamber gases occurs at a predetermined point after the compression stroke of the combustion cycle or near top dead center of compression. Since the air/fuel mixture is highly diluted by air or residuals, which results in lower combustion gas temperature, the production of NOx may be dramatically reduced compared to levels found in SI combustion. Further, fuel efficiency with autoignition of lean (or diluted) air/fuel mixture may be increased by reducing the engine pumping loss, increasing gas specific heat ratio, and by utilizing a higher compression ratio.

During HCCI combustion, autoignition of the combustion chamber gas is controlled to occur at a desired position of the piston to generate desired engine torque, and thus it may not be necessary to initiate a spark from a sparking mechanism to achieve combustion. However, a late timing of the spark plug, after an autoignition temperature should have been attained, may be utilized as a backup ignition source in the case that autoignition does not occur.

A third type of combustion that may be performed by engine 10 utilizes a sparking device to initiate (or assist) combustion when the temperature of the combustion chamber gas approaches an autoignition temperature (e.g., reaches a level substantially near autoignition without achieving combustion). Such a spark assist type of combustion can exhibit increased fuel efficiency and reduce NOx production over that of SI combustion, yet may operate in higher load range than compared with HCCI combustion. Spark assist may also offer an overall larger window for controlling temperature since it may not be necessary to precisely attain an autoignition temperature at a specified timing in the engine cycle. In other words, without spark assistance a small change in temperature may result in a rather large change in combustion timing, thus affecting engine output and performance. In the spark assist mode, it is possible to attain many of the benefits of HCCI combustion, but to rely on the spark timing to provide the final energy needed to attain autoignition and thus more precisely control the timing of combustion. Thus, in one example, under some conditions, spark assist may also be used during transitions between SI combustion and HCCI.

In one embodiment, the spark assist mode may be operated where a small amount of fuel is provided to the gases near the spark plug. This small cloud of fuel may be used to allow a flame to better propagate and generate increased pressure in the cylinder to thereby initiate auto-ignition of the remaining air-fuel mixture. Thus, a relatively small cloud of richer gases may be used that are proximate to the spark plug, which can also be homogenous, stratified, or slightly stratified. One approach to provide such operation may be to utilize a second direct fuel injection in the compression stroke.

One example of an application involving at least the three combustion modes presented above may include the use of SI for startup and/or after engine startup during an engine warming period. After such engine startup and engine warming, the combustion process may transition through spark assist combustion to HCCI combustion for improved economy and emissions. During periods of high engine load requirements, spark assist may be activated to ensure proper combustion timing. As the engine is returned to a low or moderate load requirement, the involvement of spark assist may cease in order to realize the full benefits of HCCI.

Figure 2:
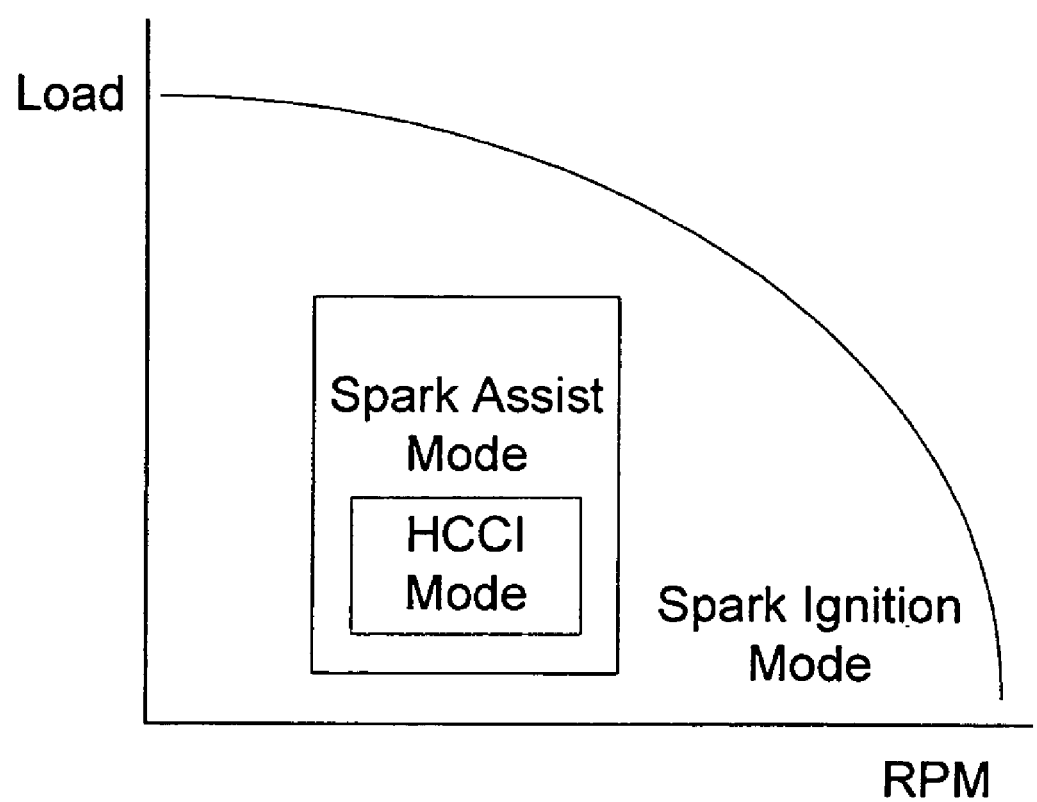
FIG. 2 shows various combustion modes operating at various load/rpm requirements.

In one embodiment of the application, engine operation can be divided into different desired combustion modes depending on the engine speed and load. FIG. 2 shows three combustion mode regions depending on engine speed and load. While FIG. 2 shows example mode regions, these may be adjusted depending on various factors, such as engine design, emissions, etc. Also, while FIG. 2 shows three different modes, additional modes may also be used. Further, only two modes may be used, if desired.

Continuing with FIG. 2, in this example, the HCCI mode is in a lower speed and load region, and is surrounded by a spark-assist mode. Further, spark ignition mode is shown for the remainder of the operating envelope. While FIG. 2 shows different modes depending on speed and load, various other operating conditions may be used, such as desired torque, manifold pressure, indicated torque, engine brake torque, temperature, combinations thereof, and various others.

As shown in FIG. 2, the HCCI region may be contained within the SI operating region in one example. Thus, in one embodiment, the ignition strategy can follow a transitional spark assist mode prior to entering the HCCI combustion region from the outer SI combustion region. However, in an alternative embodiment, the engine may transition directly between SI and HCCI modes or any combination of operating modes. Further, as noted above, additional modes may be used, such as stratified combustion, or others.

Figure 3A:
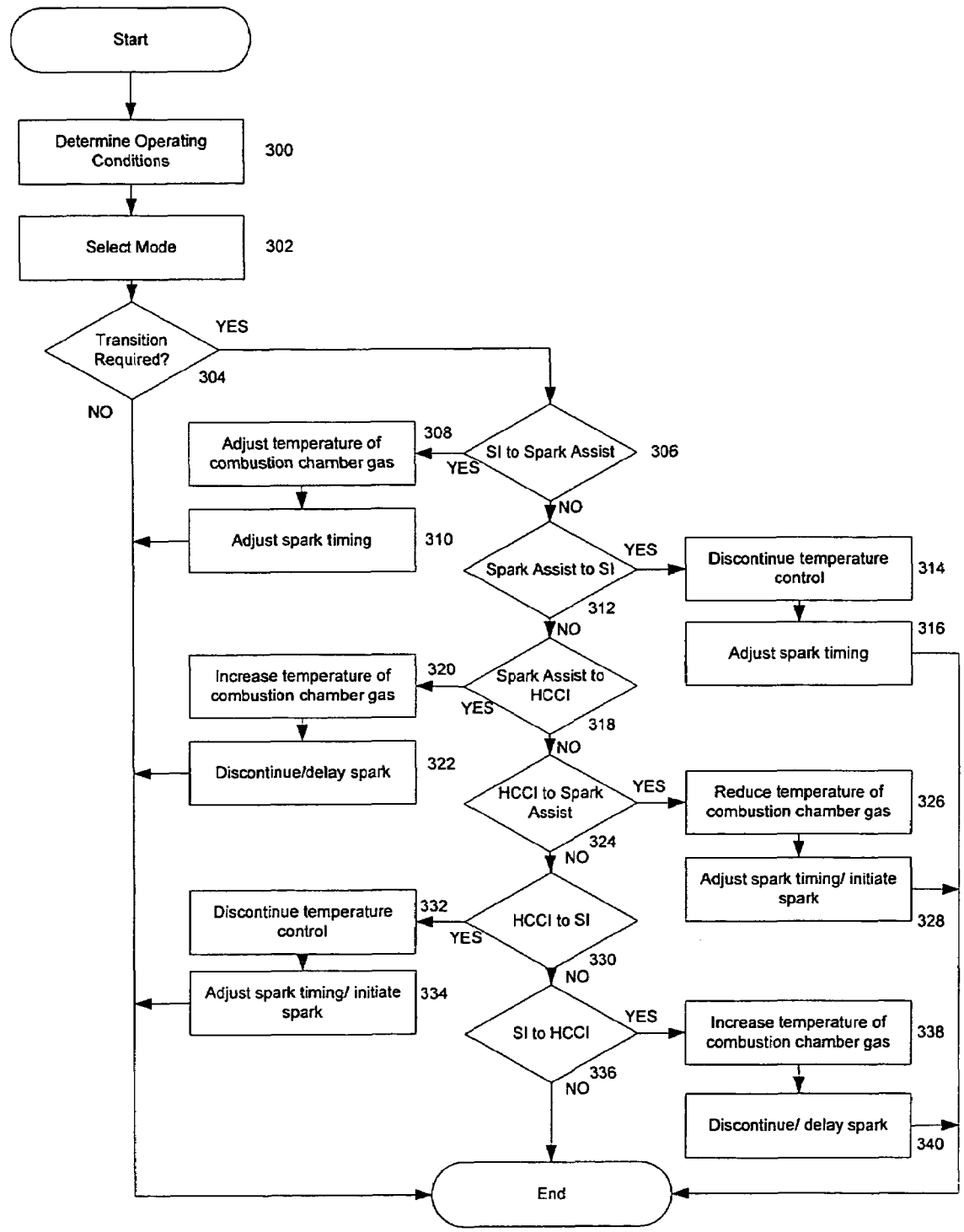
FIGS. 3A and 3B are flowcharts depicting an example method for selectively varying the combustion mode during engine operation.
Figure 3B:
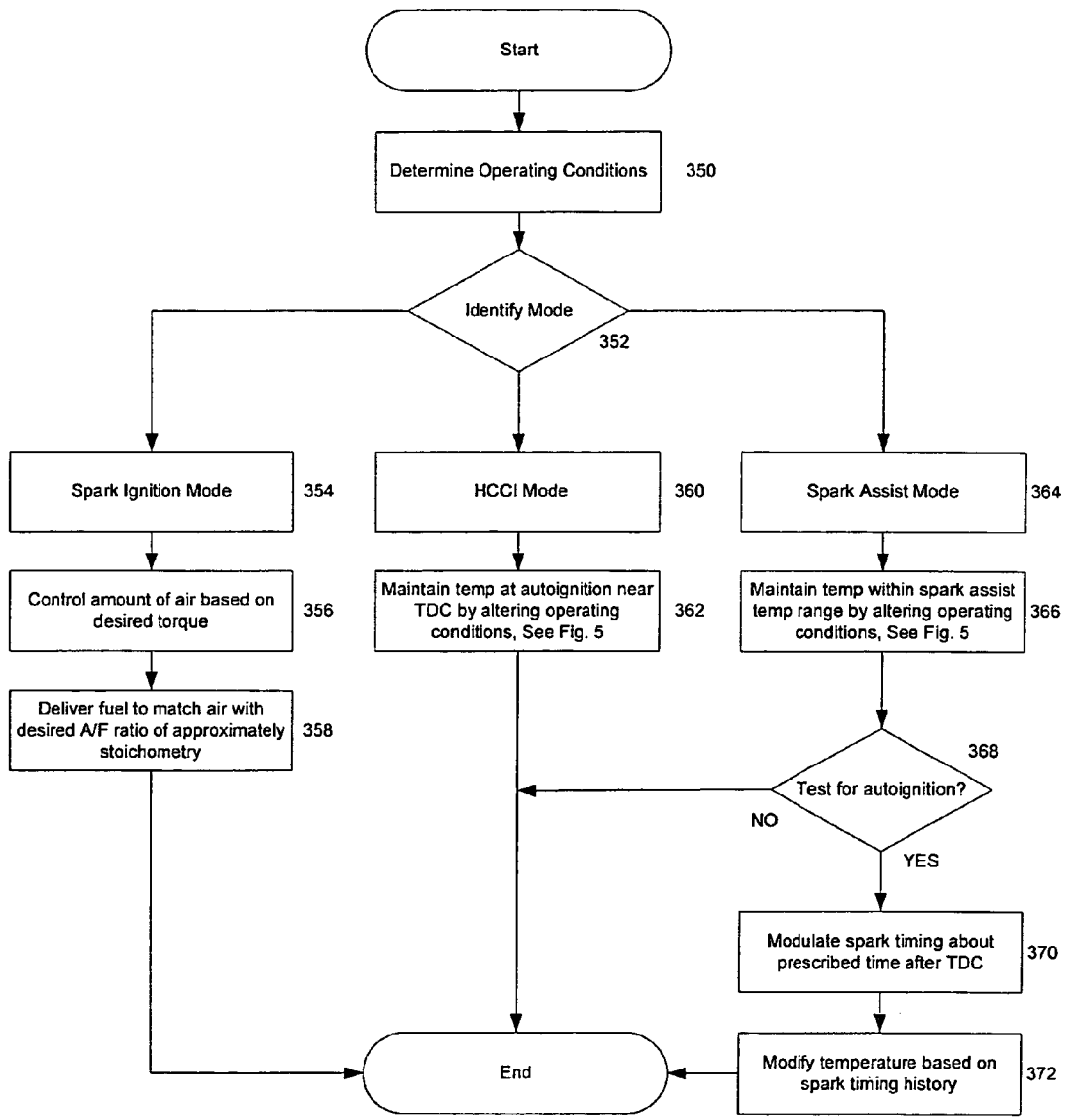

Referring now to FIGS. 3A and 3B, example routines are described for performing an engine control operation. The routines described by FIGS. 3A and 3B can provide for an improved fuel efficiency and reduction of NOx production through selectively enabling a combustion mode suitable for particular engine and/or vehicle conditions (such as engine load), thus advantageously utilizing both HCCI and spark assist modes.

Specifically, in FIG. 3A, a routine is described for selecting a desired engine combustion mode and modifying engine operating conditions during transitions between operating modes. First, at step 300, the operating conditions of the engine are determined, including, for example, desired engine output, desired load, desired air-fuel ratio, and others. Next, at 302, the appropriate operating mode is selected based on the operating conditions, as well as other engine and/or vehicle conditions, such as exhaust conditions, catalyst conditions, temperature, and others. In one example, the routine uses a map similar to that of FIG. 2 to select a desired combustion mode. Also, the mode selected may be based on transitional conditions. For example, if it is desired to change from SI mode to HCCI mode, the routine may select to transition through a spark assist mode to provide an improved transition from SI to HCCI combustion, or vice versa. Specifically, it may be difficult under some conditions to transition directly between SI to HCCI combustion, and thus as the spark assist combustion may be controlled with less precise temperature control of combustion gases, it may be used transitionally between modes.

Next, in step 304 it is judged whether a transition between modes is desired based on the desired mode and the current combustion mode. If no transition is to occur, the routine ends. Alternatively, it is judged in step 304 that a transition is requested, the routine proceeds to step 306.

At step 306, it is judged if a transition from SI to spark assist is requested. If the answer to step 306 is yes, the routine proceeds to step 308 where the temperature of the combustion chamber gas is adjusted. The adjustment of temperature may be performed by modifying the operating conditions of the engine such as through varying the valve timing, addition of exhaust gas recirculation (EGR), increasing the compression ratio, controlling aircharge temperature via a heat exchanger configuration, the contribution of supercharging or turbocharging or a combination thereof. Next, the routine proceeds to step 310 where the spark timing is adjusted, as described in more detail below with regard to FIG. 3B and FIG. 4, for example. Next, the routine ends. Alternatively, if the answer to step 306 is no, the routine proceeds to step 312.

At step 312 it is judged if a transition from spark assist to SI is requested. If the answer to step 312 is yes, then the routine proceeds to step 314, where the temperature control of the combustion chamber gas is discontinued. Next, the routine proceeds to step 316 where the spark timing is adjusted to the appropriate timing based on engine operating conditions. In other words, the routine returns to combustion where the engine carries out conventional spark ignition combustion. Next, the routine ends. Alternatively, if the answer to step 312 is no, the routine proceeds to step 318.

At step 318 it is judged if a transition from spark assist to HCCI is requested. If the answer to step 318 is yes, the routine proceeds to step 320 where the temperature of the combustion chamber gas is increased to the autoignition temperature by adjusting engine parameters, such as described herein. For example, valve timing may be adjusted via a cam profile switching mechanism to increase effective compression ratio and retain increased residual exhaust gasses, thereby raising charge temperature. However, various other approaches may also be used, such as application of heat exchangers to heat a stream of intake air and mix the heated and un-heated intake airstreams to control the intake air temperature, or combinations of various parameters. Next, the routine proceeds to step 322 where the spark timing is delayed or discontinued. For example, the spark timing may be delayed to a point past an expected autoignition timing. Next, the routine ends. Alternatively, the answer to step 318 is no, the routine proceeds to step 324.

At step 324 it is judged if a transition from HCCI to spark assist is requested. If the answer to step 324 is yes, the routine proceeds to step 326 where the temperature of the combustion chamber gas is decreased so that autoignition is reduced, and thus spark timing may be used to control the timing of combustion. Thus, the routine proceeds to step 328 where the spark timing is adjusted or initiated. Next, the routine ends. Alternatively, if the answer to step 324 is no, the routine proceeds to step 330.

At step 330 it is judged if a transition from HCCI to SI is requested. If the answer to step 330 is yes, the routine proceeds to step 332 where the temperature control of the combustion chamber gas is discontinued. The temperature control may be discontinued, or gradually reduced, depending on the transition conditions, in one example. For example, the spark assist may gradually be adjusted to conventional spark ignition timing over several cycles, if desired. Thus, the routine then proceeds to step 334 where the spark timing is adjusted or initiated based on engine operating conditions, including temperature, speed, load, and others. Next, the routine ends. Alternatively, the answer to step 330 is no, the routine proceeds to step 336.

At step 336, it is judged if a transition from SI to HCCI is requested. If the answer to step 336 is yes, the routine proceeds to step 338, where the temperature of the combustion chamber gas is increased to the autoignition temperature as described above herein. Next, the routine proceeds to step 340 where the spark timing is delayed or discontinued. Next, the routine ends. Alternatively, the answer to step 336 is no, the routine ends.

Referring to FIG. 3B, a routine is described for identifying the operating mode and modifying engine operating conditions based on a selected combustion mode. First, at step 350, the engine operating conditions are determined. For example, the routine determines engine speed, load, torque, temperatures (e.g., engine coolant temperature, air temperature, ambient temperature), and other parameters. Next, the routine proceeds to step 352 where the current operating mode is identified. If SI mode is selected, the routine proceeds to step 354. Next, the routine proceeds to step 356 where the air supplied to the engine is controlled based on the torque requirements of the engine. Next, the routine proceeds to step 358 where fuel is supplied to match the air supplied to the engine in order to create an air/fuel ratio approximately about stoichiometry. Next, the routine ends.

If on the other hand, HCCI mode is selected at step 352, the routine proceeds to step 360. Next, the routine proceeds to step 362 where the temperature of combustion chamber gas is maintained at autoignition temperature near TDC by altering operating conditions, such as those described above herein. For example, the routine may adjust valve timing, valve lift, the ratio of two intake airstreams that flow through or by-pass the heat exchangers, spark timing, EGR, turbo or super charger, and/or combinations thereof. Next, the routine ends.

If, on the other hand, spark assist mode is selected at step 352, the routine proceeds to step 364. Next, the routine proceeds to step 366 where the temperature of combustion chamber gas is maintained within the spark assist temperature range to retard autoignition, as described herein with regard to FIG. 4, for example. Next, the routine proceeds to step 368 where it is judged whether to test for autoignition. As described below, the routine may alter timing of the spark during this mode to determine if there is an expected effect caused by said variation. Such information can be used to vary the mixture temperature to enable improved spark assist combustion timing control.

If the answer to step 368 is no, the routine ends. If the answer to step 368 is yes, the routine proceeds to step 370 where the spark timing is modulated about a prescribed time shortly after TDC. Next, the routine proceeds to step 372 where the temperature of the gas within the combustion chamber is modified based on the spark timing history determined from step 370. For example, if it is determined that the firing of the spark is not controlling the timing of combustion (i.e., autoignition is occurring substantially without the spark), then temperature of the mixture may be reduced to return primary control of combustion timing to the firing of the spark plug. Further, this information can be used to improve transitions between various modes in that a more accurate identification of the limits of autoignition can be identified during engine operation and take into account varying conditions and aging effects. Finally, the routine ends.

Figure 4A:
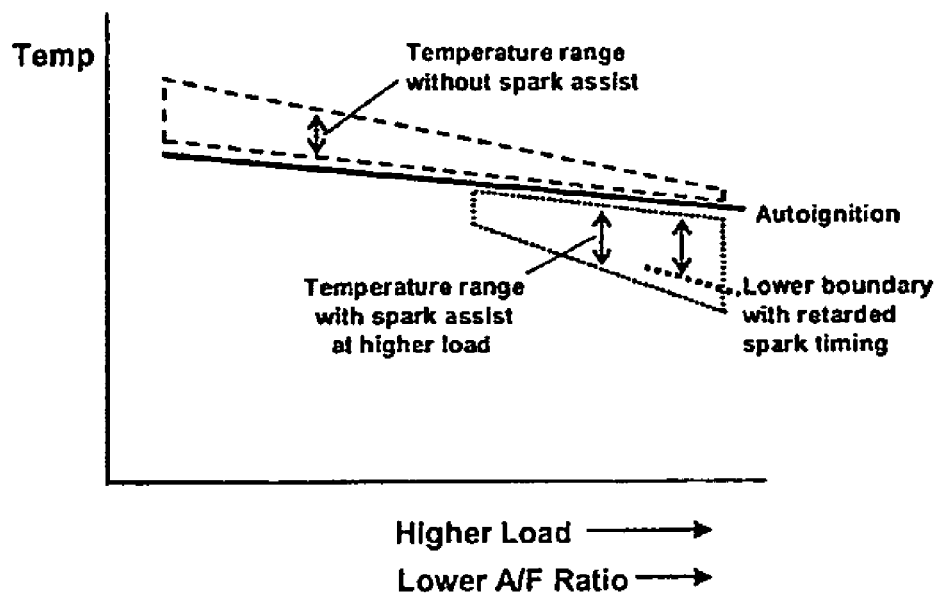
FIGS. 4A and 4B are graphs showing example temperature windows with and without spark assist as a function of engine load and air/fuel ratio.

Referring now to FIG. 4A, it shows a graph of autoignition temperature at various engine loads as the solid line. During periods of high engine load in HCCI mode without spark assist, the acceptable temperature control window decreases with decreased air/fuel ratios, as schematically shown in FIG. 4A. A smaller temperature window results in increased difficulty in autoignition timing control. Additionally, FIG. 4A shows a desired or acceptable temperature range of the air and fuel mixture in the combustion chamber during a spark assist mode at higher loads. The wider temperature window due to spark assistance improves controllability of combustion timing; hence the HCCI operating range can be utilized at higher load. Also, while FIG. 4A shows variation with load, the temperatures or temperature ranges may also vary with combustion air-fuel ratio or the gas/fuel ratio.

Furthermore, combustion timing of spark-assist autoignition at higher load can be further retarded to reduce engine heat transfer losses and constrain the peak cylinder pressure, which affects the required rigidity of engine structure. Without spark assistance, retarding HCCI combustion timing is constrained by misfire. This is because the released heat and radicals generated during the low-temperature reactions at or before TDC may not be sufficient to proceed to high-temperature reactions in the mixture if the gas temperature drops too quickly due to expansion. With a spark occurring after TDC, the combustion timing can be further retarded and thus increase the HCCI operating range to higher loads. It should be pointed out that significantly further retard of spark timing from TDC changes the lower boundary of the temperature range, as shown in FIG. 4A. When the engine load increases and the spark timing is to be further retarded, the engine controller controls the devices, such as the ratio of two intake airstreams that flow through or by-pass the heat exchangers, EGR rate, valve timing, valve lift, or others to increase the gas temperature slowly but continuously to make sure that autoignition can occur with spark assistance. The increase in gas temperature may be stopped when it is detected that the spark plays no role in autoignition, as described later. At that time, the gas temperature may be adjusted to be a slightly lower for using a spark to control combustion timing.

Alternatively, with FIG. 4B, a target temperature range for utilizing the spark-assist mode is shown below the autoignition temperature, where the target temperature range is gradually further from the auto-ignition temperature with increasing load (and/or with decreasing air-fuel ratio). Further, in an alternative embodiment, the lower limit of the temperature range can be a function of air/fuel ratio and the upper limit a function of autoignition temperature and load. The temperature difference, denoted as DT, represents a difference between the autoignition temperature and the upper temperature of the spark assist temperature range. As described herein, this difference can be used to adjust the engine parameters (such as temperature) to provide a greater difference between the mixture temperature and the autoignition temperature as load and or air-fuel ratio changes, thus enabling extension of the spark assist mode. This difference may also be used to facilitate HCCI-SI mode transition, because the mixture temperature is lower and more close to the temperature required for SI combustion.

In other words, as load increases the temperature required for autoignition can decrease, at least in some load ranges, due to the increased pressure and therefore increased oxygen density within the combustion chamber. Also, under high load conditions, the temperature range or temperature window decreases with decreased air/fuel ratios. On the other hand, as load increases, the control of temperature within the combustion chamber can degrade. Thus, in one embodiment, a desired temperature difference (DT) can be increased with increased load or varying air/fuel ratio in order to account for the greater error associated with temperature control so that autoignition temperature is not achieved, but rather combustion is timed by the firing of the spark plug.

Figure 4B:
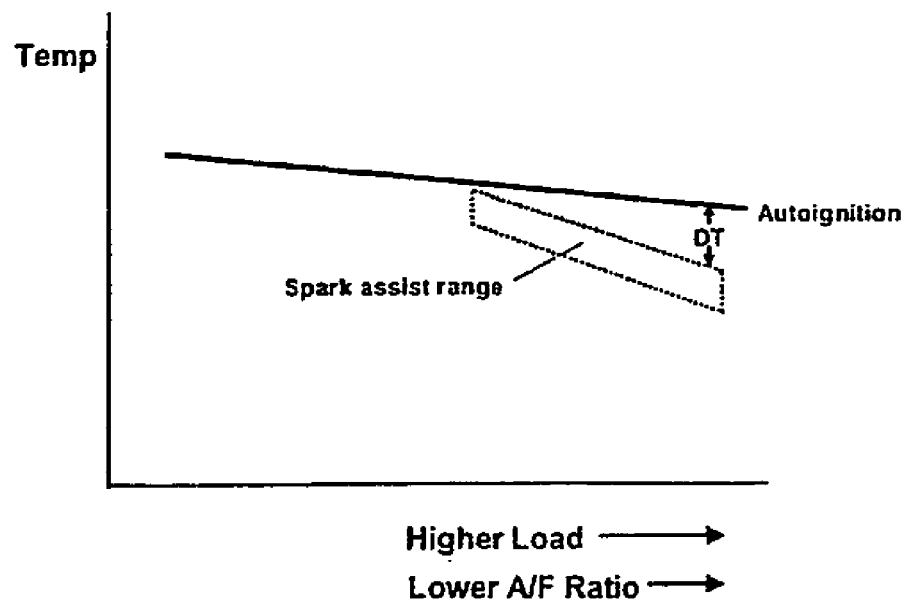
Figure 5:
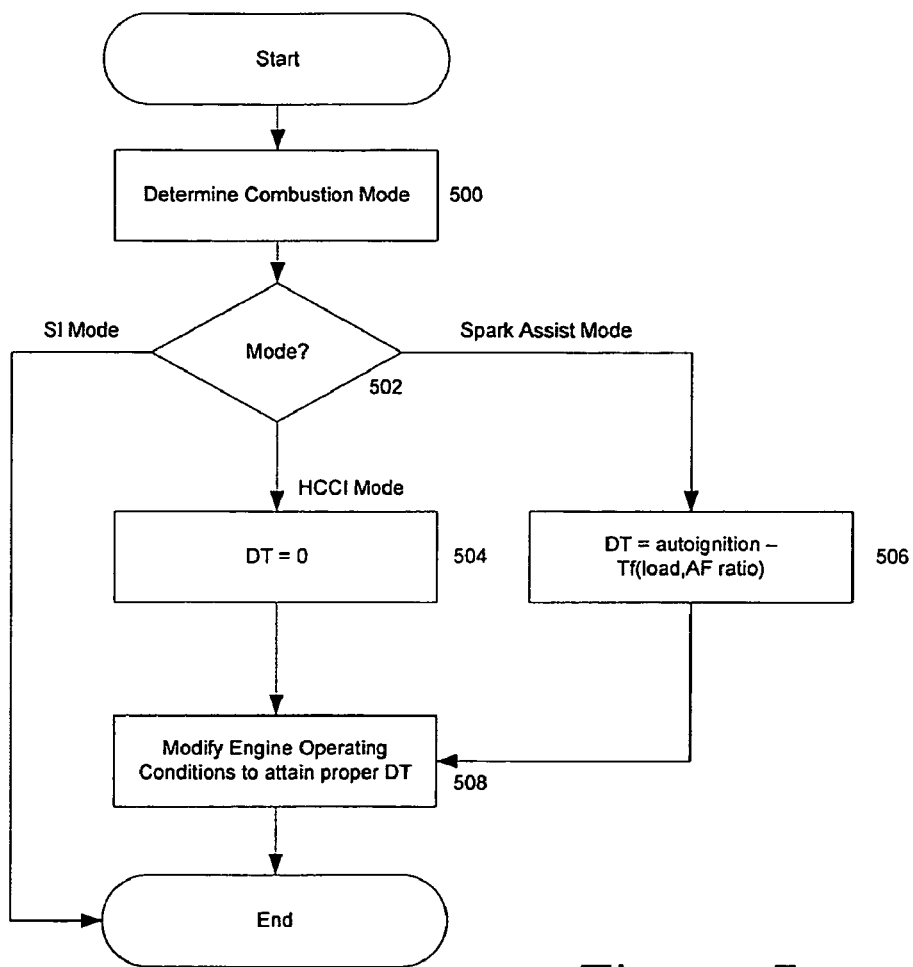
FIG. 5 is a view of an example method for determining the target air and fuel mixture operating temperature.

Referring to FIG. 5, an example routine is described for determining the target engine operating temperature depending on combustion mode utilizing the information in FIGS. 4A and 4B. The routine begins at step 500 where the combustion mode is determined. Next, the routine proceeds to step 502 where the combustion mode is identified, as determined in FIG. 3. If the engine is operating in SI mode the routine ends since temperature control under SI operations may be discontinued or reduced.

Alternatively, if it is judged at step 502 that the engine is operating in HCCI mode, the routine proceeds to step 504, where the temperature difference between the target temperature and autoignition (DT) is set to zero. In other words, the temperature control during an HCCI mode is selected to achieve the autoignition temperature without spark assist.

If, instead it is judged at step 502 that the engine is operating in spark assist mode, the routine proceeds to step

506 where DT is determined as the difference between the autoignition temperature and the upper limit of the spark assist temperature range as a function of load, speed, and/or air/fuel ratio. Next, the routine proceeds to step 508 where the engine operating conditions may be modified in order to attain the target temperature from the calculated DT.

As noted above, adjustment of the target temperature range may occur not only in the spark assist mode, but also when the engine is transitioning between operating modes. For example, during transition periods between modes, the target operating temperature may be a function based on the beginning and ending target temperatures of the modes involved in the transition.

Figure 6A:
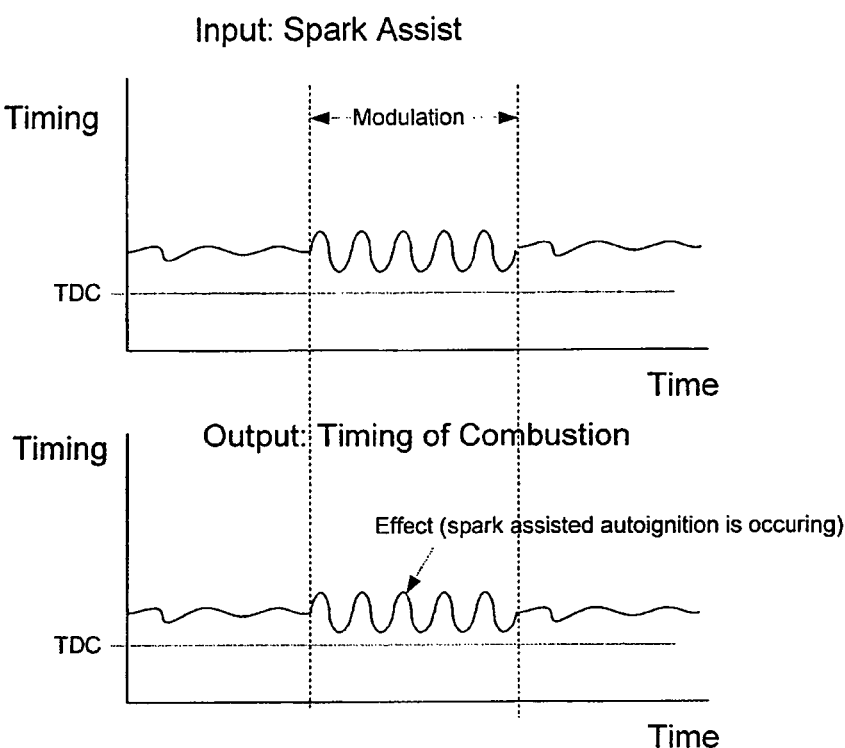
FIGS. 6A and 6B are views of an example temperature measurement system through the intentional varying of the spark timing to determine whether auto-ignition is occurring.
Figure 6B:
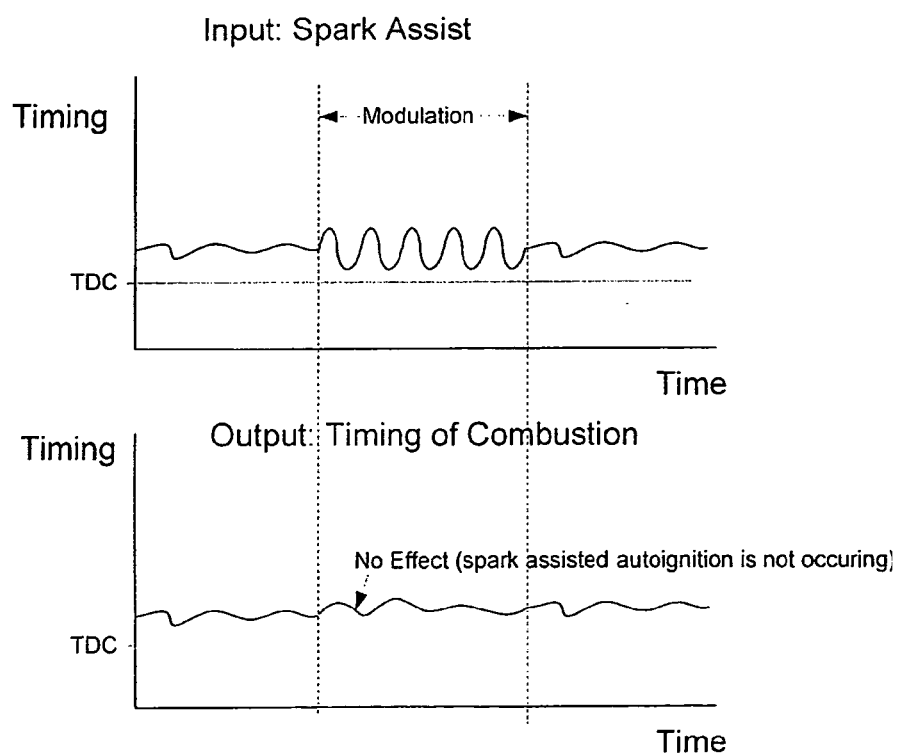

Referring now to FIGS. 6A and 6B, example results are illustrated for the testing procedure described above herein. Specifically, FIGS. 6A and 6B are graphs showing an example input spark assist operation where the spark timing may be varied or modulated in order to detect whether autoignition is occurring at a desired timing and to further serve as an indirect method for detecting temperature of the combustion chamber gasses. In one example implementation of the process, the spark timing may be modulated around a prescribed time after top dead center of the compression stroke and may be applied at times during the spark assist mode or during transitions between modes. The modulation of the spark timing may produce a resulting combustion timing, for example the timing of 50% heat released or the timing of peak heat release rate, that varies depending on whether autoignition is occurring or is not occurring at a desired timing.

For example, if the input is the modulation of the spark timing around a prescribed time after TDC under conditions where autoignition is not attained without a spark, then the output as shown in FIG. 6A may be a proportionate combustion timing indicating that the timing of combustion (and the fact that combustion occurs) is substantially due to the spark assist. On the other hand, an example output as shown in FIG. 6B may be absent of any effect of the modulated spark and therefore indicates that autoignition is occurring prior to the spark assist timing. In other words, the spark assist is substantially ineffective in controlling combustion timing. As described above and below in more detail, this information may be used to adjust engine operating conditions, such as mixture temperature, air-fuel ratio, valve timing, etc., to reduce the likelihood of autoignition, and return combustion timing control primarily to the spark timing.

Further, the extent to which autoignition is occurring premature of a prescribed time or engine position may be determined from the difference between the timing of the spark generated by the sparking device and the timing of combustion. For example, if the spark generated from the sparking device is concurrent with combustion, then autoignition may not be occurring and therefore the temperature of the combustion chamber gas is lower than required for autoignition. On the other hand, if the spark generated from the sparking device occurs after combustion, it may be inferred that the combustion occurred due to autoignition; hence the temperature of the combustion chamber gas has attained the autoignition temperature.

Alternatively, whether or not the spark is effective in assisting autoignition may also be ascertained by detecting the timing of peak cylinder pressure during modulation of spark timing. If the spark plays a role in assisting autoignition, the timing of peak cylinder pressure will also vary according to the variation of spark timing.

In a one example implementation of the spark modulation process, the operating conditions of the engine may be modified, based on timing history results, to achieve a prescribed temperature within the combustion chamber. For example, if the modulation of the spark timing determines that autoignition is occurring while operating in spark assist mode, it may be possible to retard autoignition through the reduction of operating temperature by reducing EGR or heat exchanger contribution, adjusting valve timing, reducing the compression ratio or modifying another operating condition of the engine, etc. Thus, the spark assist modulation may be varied concurrently with the engine operating conditions in an iterative manner to promote proper autoignition timing and provide an indirect method of temperature detection.

Figure 7A:
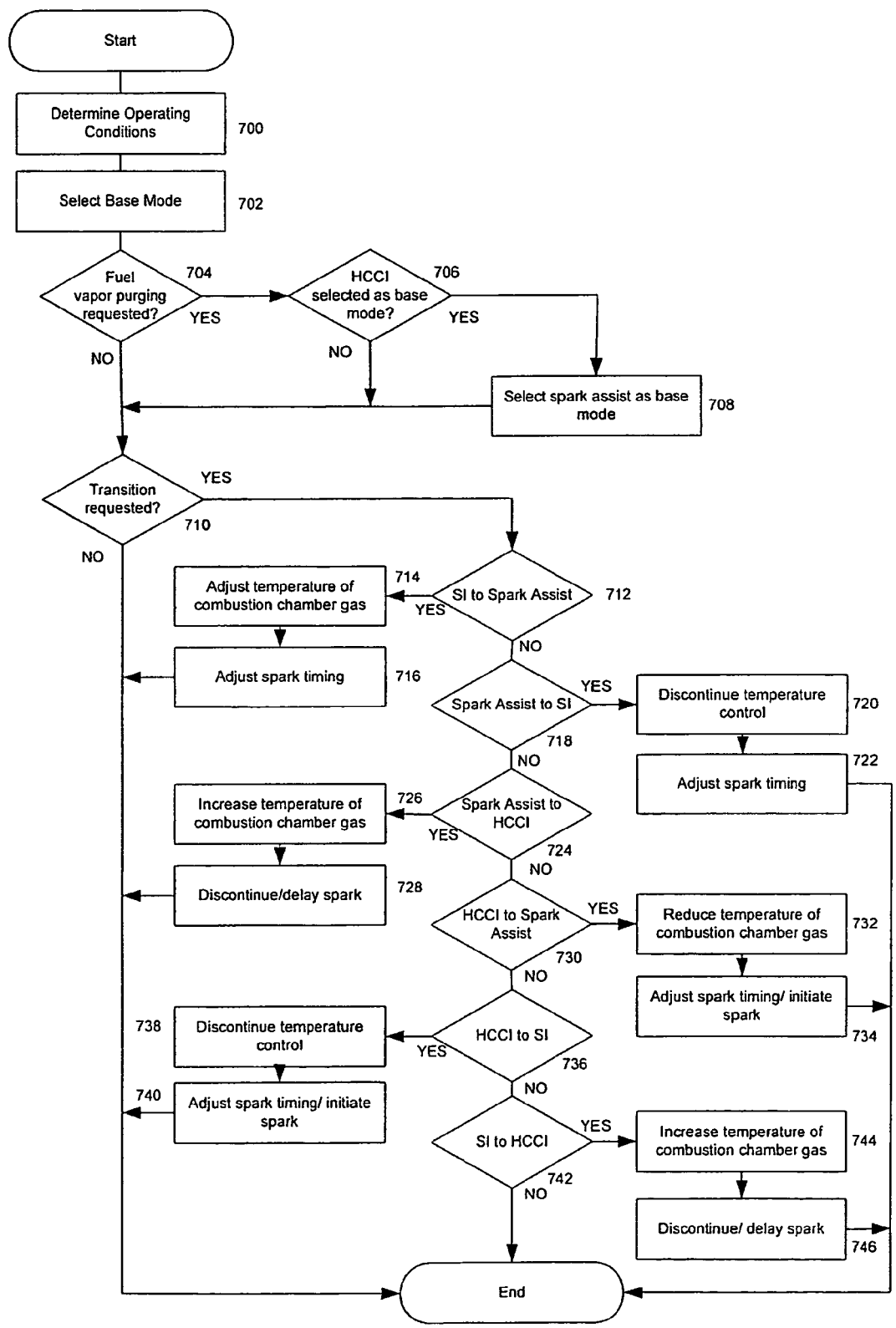
FIGS. 7A and 7B are flowcharts depicting an example method for selectively varying the combustion mode during engine operation, including fuel vapor purging.
Figure 7B:
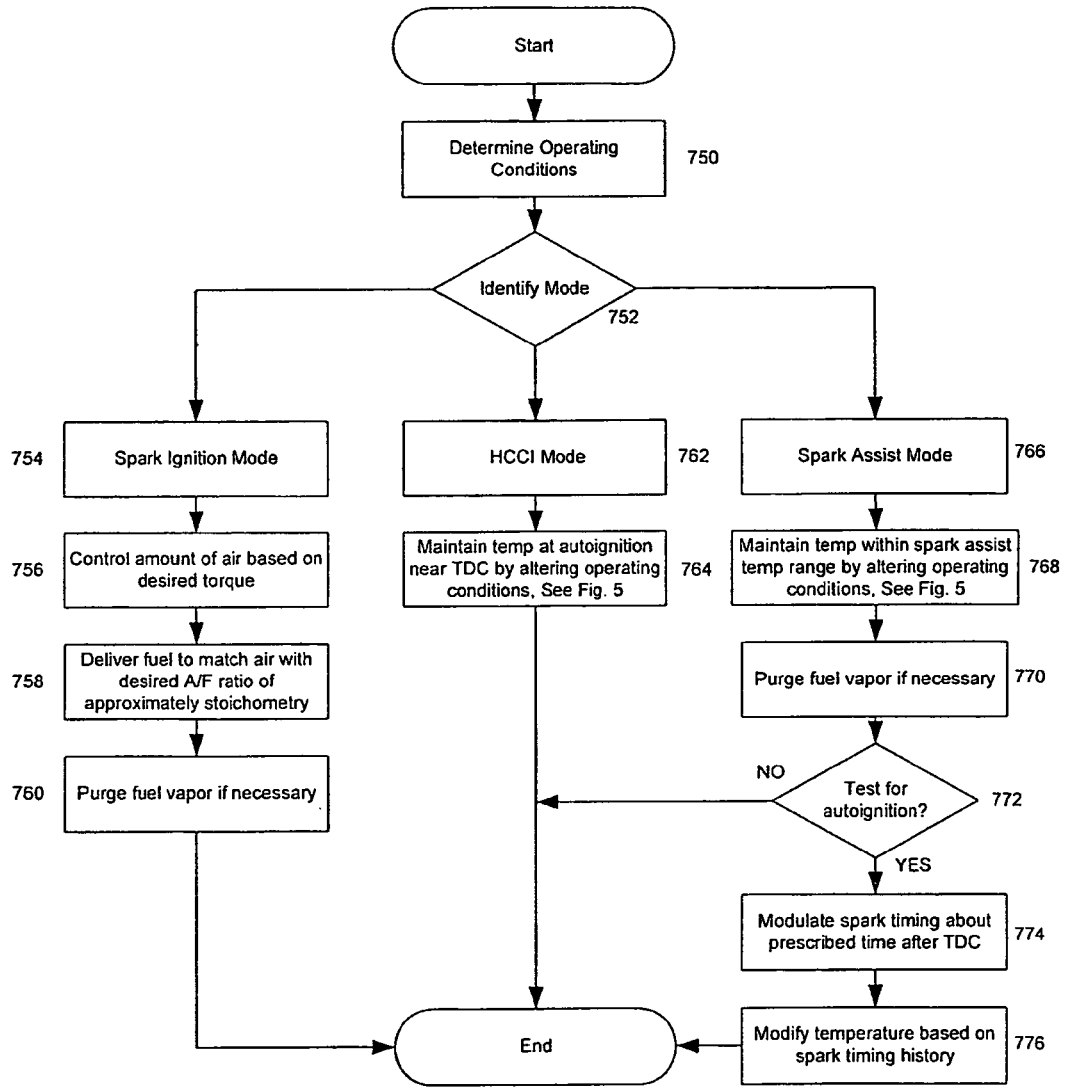

Referring now to FIGS. 7A and 7B, example routines are described for performing an engine control operation. The routines described by FIGS. 7A and 7B can provide for an improved fuel efficiency and reduction of NOx production through selectively enabling a combustion mode suitable for particular engine and/or vehicle conditions (such as engine load), thus advantageously utilizing both HCCI and spark assist modes where applicable, while further accounting for fuel vapor purging.

Specifically, in FIG. 7A, a routine is described for selecting a desired engine combustion mode and modifying engine operating conditions during transitions between operating modes. First, at step 700, the operating conditions of the engine are determined, including, for example, desired engine output, desired load, desired air-fuel ratio, and others. Next, at 702, a base operating mode is selected with regard to a variety of operating conditions, as well as other engine and/or vehicle conditions, such as exhaust conditions, catalyst conditions, temperature, and others. In one example, the routine uses a map similar to that of FIG. 2 to select a desired combustion mode. Also, the mode selected may be based on transitional conditions. For example, if it is desired to change from SI mode to HCCI mode, the routine may select to transition through a spark assist mode to provide an improved transition from SI to HCCI combustion, or vice versa. Specifically, it may be difficult under some conditions to transition directly between SI to HCCI combustion, and thus as the spark assist combustion may be used with less precise temperature control, it may be used transitionally between modes.

Next, at step 704 it is judged whether fuel vapor purging is requested. If the answer at step 704 is yes, the routine proceeds to step 706, where it is judged whether the HCCI mode is the preferred mode. If the answer at step 706 is yes the routine proceeds to step 708 where the spark assist mode is chosen as the base mode. As spark assist may be utilized during fuel vapor purging operations, the proximity of engine operating temperature to auto-ignition temperature may vary with the amount of fuel vapors in order to discourage premature auto-ignition. In this manner, HCCI mode may not be utilized when fuel vapor purging is requested.

Alternatively, if the answer at step 706 is no, the routine proceeds to step 710. Likewise, if the answer to step 704 is no, the routine proceeds to step 710 where it is judged whether a transition is requested. If the answer at step 710 is no, the routine ends, since no transition is requested. Alternatively, if the answer to step 710 is yes, the routine proceeds to step 712 where it is judged whether a transition from SI to spark assist mode is requested.

If the answer to step 708 is yes, the routine proceeds to step 710 where the temperature of the combustion chamber gas is adjusted. The adjustment of temperature may be performed by modifying the operating conditions of the engine such as through varying the valve timing, addition of exhaust gas recirculation (EGR), increasing the compression ratio, controlling aircharge temperature via a heat exchanger configuration, the contribution of supercharging or turbocharging or a combination thereof. Next, the routine proceeds to step 712 where the spark timing is adjusted, as described in more detail below with regard to FIG. 7B and FIG. 4, for example. Next, the routine ends. Alternatively, if the answer to step 708 is no, the routine proceeds to step 714.

At step 714 it is judged if a transition from spark assist to SI is requested. If the answer to step 714 is yes, then the routine proceeds to step 716, where the temperature control of the combustion chamber gas is discontinued. Next, the routine proceeds to step 718 where the spark timing is adjusted to the appropriate timing based on engine operating conditions. In other words, the routine returns to combustion where the engine carries out conventional spark ignition combustion. Next, the routine ends. Alternatively, if the answer to step 714 is no, the routine proceeds to step 720.

At step 720 it is judged if a transition from spark assist to HCCI is requested. If the answer to step 720 is yes, the routine proceeds to step 722 where the temperature of the combustion chamber gas is increased to the autoignition temperature by adjusting engine parameters, such as described herein. For example, valve timing may be adjusted via a cam profile switching mechanism to increase effective compression ratio and retain increased residual exhaust gasses, thereby raising charge temperature. However, various other approaches may also be used, such as application of heat exchangers to heat a stream of intake air and mix the heated and un-heated intake airstreams to control the intake air temperature, or combinations of various parameters. Next, the routine proceeds to step 724 where the spark timing is delayed or discontinued. For example, the spark timing may be delayed to a point past an expected autoignition timing. Next, the routine ends. Alternatively, the answer to step 720 is no, the routine proceeds to step 726.

At step 726 it is judged if a transition from HCCI to spark assist is requested. If the answer to step 726 is yes, the routine proceeds to step 728 where the temperature of the combustion chamber gas is decreased so that autoignition is reduced, and thus spark timing may be used to control the timing of combustion. Thus, the routine proceeds to step 730 where the spark timing is adjusted or initiated. Next, the routine ends. Alternatively, if the answer to step 726 is no, the routine proceeds to step 732.

At step 732 it is judged if a transition from HCCI to SI is requested. If the answer to step 732 is yes, the routine proceeds to step 734 where the temperature control of the combustion chamber gas is discontinued. The temperature control may be discontinued, or gradually reduced, depending on the transition conditions, in one example. For example, the spark assist may gradually be adjusted to conventional spark ignition timing over several cycles, if desired. Thus, the routine then proceeds to step 736 where the spark timing is adjusted or initiated based on engine operating conditions, including temperature, speed, load, and others. Next, the routine ends. Alternatively, the answer to step 732 is no, the routine proceeds to step 738.

At step 738, it is judged if a transition from SI to HCCI is requested. If the answer to step 738 is yes, the routine proceeds to step 740, where the temperature of the combustion chamber gas is increased to the autoignition temperature as described above herein. Next, the routine proceeds to step 742 where the spark timing is delayed or discontinued. Next, the routine ends. Alternatively, the answer to step 744 is no, the routine ends.

Referring to FIG. 7B, a routine is described for identifying the operating mode and modifying engine operating conditions based on a selected combustion mode. First, at step 750, the engine operating conditions are determined. For example, the routine determines engine speed, load, torque, temperatures (e.g., engine coolant temperature, air temperature, ambient temperature), and other parameters. Next, the routine proceeds to step 752 where the current operating mode is identified. If SI mode is selected, the routine proceeds to step 754, where the spark ignition mode is selected. Next, the routine proceeds to step 756 where the air supplied to the engine is controlled based on the torque requirements of the engine. Next, the routine proceeds to step 758 where fuel is supplied to match the air supplied to the engine in order to create an air/fuel ratio approximately about stoichiometry. Next, the routine proceeds to step 760, where fuel vapor may be purged if necessary. Next, the routine ends.

If on the other hand, HCCI mode is selected, the routine proceeds to step 762. Next, the routine proceeds to step 764 where the temperature of combustion chamber gas is maintained at autoignition temperature near TDC by altering operating conditions, such as those described above herein. For example, the routine may adjust valve timing, valve lift, the ratio of two intake airstreams that flow through or by-pass the heat exchangers, spark timing, EGR, turbo or super charger, and/or combinations thereof. Next, the routine ends.

If, on the other hand, spark assist mode is selected, the routine proceeds to step 766. Next, the routine proceeds to step 768 where the temperature of combustion chamber gas is maintained within the spark assist temperature range in order to retard autoignition, as described herein with regard to FIG. 4, for example. Next, the routine proceeds to step 770, where if necessary, fuel vapor is purged. Next, the routine proceeds to step 772 where it is judged whether to test for autoignition. As described below, the routine may alter timing of the spark during this mode to determine if there is an expected effect caused by said variation. Such information can be used to vary the mixture temperature to enable improved spark assist combustion timing control.

If the answer to step 772 is no, the routine ends. If the answer to step 772 is yes, the routine proceeds to step 774 where the spark timing is modulated about a prescribed time shortly after TDC. Next, the routine proceeds to step 776 where the temperature of the gas within the combustion chamber is modified based on the spark timing history determined from step 772. For example, if it is determined that the firing of the spark is not controlling the timing of combustion (i.e., autoignition is occurring substantially without the spark), then temperature of the mixture may be reduced to return primary control of combustion timing to the firing of the spark plug. Further, this information can be used to improve transitions between various modes in that a more accurate identification of the limits of autoignition can be identified during engine operation and take into account varying conditions and aging effects. Finally, the routine ends.

Note that the control and estimation routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of operating an internal combustion engine having a combustion chamber with a piston, comprising:
    inducting at least air and fuel vapors from a fuel vapor system; and
    adjusting an operating condition of the engine so that a mixture of air and fuel in the combustion chamber, including said fuel vapor, approaches, but does not achieve, an autoignition temperature; and performing a spark from the spark plug so that said mixture substantially auto-ignites.

2. The method of claim 1, where the operating condition includes temperature.

3. The method of claim 1, where the operating condition includes the ratio of two intake airstreams that flow through or by-pass the heat exchangers, which are designed for heat transfer between the intake air and the coolant, exhaust gases, or other thermal energy sources.

4. The method of claim 1, where the operating condition includes valve timing.

5. The method of claim 1, where the operating condition includes exhaust gas recirculation.

6. The method of claim 1, where the operating condition includes the spark timing.

7. The method of claim 1, where the operating condition includes a supercharger condition.

8. The method of claim 1, where the operating condition includes a turbocharger condition.

9. The method of claim 1, where the operating condition includes compression ratio.

10. The method of claim 1, where said performing of said spark from the spark plug occurs after top dead center of the piston position.

11. The method of claim 1, where combustion timing is varied during as engine load varies.

12. The method of claim 1, where the spark timing is varied as engine load varies.

13. The method of claim 1, where an amount by which said temperature approach said auto-ignition temperature varies with an amount of fuel vapors.

14. The method of claim 1 wherein said operation is performed in response to a request to purge fuel vapors.

15. The method of claim 1 wherein said operation is performed in response to a request to purge fuel vapors, where the engine transitions from operation without spark ignition to said operation in response to said request.

16. A method of operating an internal combustion engine having a combustion chamber with a piston, comprising:
    during a first mode, adjusting a temperature of a first homogenous air and fuel mixture of the engine so that said first mixture in the combustion chamber attains an autoignition temperature and combusts without requiring a spark from the spark plug; and
    during a second mode, adjusting a temperature of a second air and fuel mixture of the engine so that said second mixture of air and fuel in the combustion chamber approaches, but does not achieve, said autoignition temperature; and performing a spark from the spark plug after top dead center of piston position so that said second mixture combusts, wherein fuel vapors from a fuel tank system are inducted into the engine during said second mode.

17. The method of claim 16 where said second mode is performed when fuel vapor purging is requested during said first mode.

18. The method of claim 16 wherein during said second mode, said temperature of said second air and fuel mixture is adjusted to be further from said autoignition temperature as engine load increases.

19. The method of claim 16 wherein during said second mode, said temperature of said second air and fuel mixture is adjusted to be further from said autoignition temperature as an amount of fuel vapors changes.

20. A system, comprising:
    an engine having a cylinder therein;
    a fuel injector coupled to said cylinder and configured to directly inject fuel into said cylinder;
    a fuel system coupled to said injector;
    an air intake manifold coupled to said cylinder;
    a fuel purge valve coupled to said intake manifold;
    a spark plug coupled to said cylinder; and
    a controller configured to control engine cylinder charge temperature so that a mixture of air and fuel in the combustion chamber, including fuel vapor, approaches, but does not achieve, an autoignition temperature; said controller further configured to perform a spark from said spark plug so that said mixture substantially auto-ignites, wherein during said fuel purging, said operating temperature is adjusted to retard autoignition of fuel, where fuel from said fuel injection is mixed with intake air and inducted fuel vapors.

* * * * *